United States Patent
Mohalik

(10) Patent No.: US 8,412,668 B2
(45) Date of Patent: Apr. 2, 2013

(54) OFFLINE FORMAL VERIFICATION OF EXECUTABLE MODELS

(75) Inventor: Swarup K. Mohalik, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 840 days.

(21) Appl. No.: 12/579,141

(22) Filed: Oct. 14, 2009

(65) Prior Publication Data
US 2011/0088017 A1 Apr. 14, 2011

(51) Int. Cl.
*G06F 17/00* (2006.01)
(52) U.S. Cl. .......................................... 706/56
(58) Field of Classification Search .................. 706/12, 706/45, 47, 56, 62; 717/127; 714/26
See application file for complete search history.

(56) References Cited

U.S. PATENT DOCUMENTS

| | | | |
|---|---|---|---|
| 8,005,661 B2 * | 8/2011 | Ganai et al. ...................... 703/22 |
| 8,024,691 B2 * | 9/2011 | Zilic et al. ...................... 716/132 |
| 2002/0099982 A1 | 7/2002 | Andersen et al. |
| 2002/0165701 A1 | 11/2002 | Lichtenberg et al. |
| 2005/0071818 A1 * | 3/2005 | Reissman et al. ............. 717/127 |
| 2005/0096894 A1 | 5/2005 | Szpak et al. |
| 2005/0223353 A1 | 10/2005 | Keidar-Barner et al. |
| 2006/0053408 A1 | 3/2006 | Kornerup et al. |
| 2006/0064291 A1 | 3/2006 | Pattipatti et al. |
| 2006/0224361 A1 | 10/2006 | McIntyre et al. |
| 2007/0260438 A1 | 11/2007 | Langer et al. |
| 2007/0282586 A1 | 12/2007 | Szpak et al. |
| 2007/0288213 A1 | 12/2007 | Schantl et al. |
| 2008/0004840 A1 | 1/2008 | Pattipatti et al. |
| 2008/0256518 A1 * | 10/2008 | Aoshima et al. ............... 717/127 |
| 2011/0087923 A1 * | 4/2011 | Mohalik et al. .................. 714/26 |
| 2011/0208501 A1 * | 8/2011 | Yeolekar et al. ................. 703/13 |
| 2011/0239203 A1 * | 9/2011 | Sukumaran et al. .......... 717/157 |
| 2011/0239204 A1 * | 9/2011 | Sukumaran et al. .......... 717/157 |

OTHER PUBLICATIONS

Thiagarajan, Distributed Versions of Linear Time Temporal Logic: A Trace Perspective, 1998, BRICS Dept of CS, U of Aarhus, Denmark, pp. 1-52.*

Ansuman Banerjee, Pallab Dasgupta and Partha P. Chakrabarti, "Can Semi-Formal be Made More Formal?", Next Generation Design and Verification Methodologies for Distributed Embedded Control Systems, Proceedings of the GM R&D Workshop, Bangalore, India, Jan. 2007, pp. 193-211.

* cited by examiner

*Primary Examiner* — David Vincent
(74) *Attorney, Agent, or Firm* — John A. Miller; Miller IP Group, PLC

(57) ABSTRACT

A system and method for automatic formal verification of an executable system includes an assertion monitor configured to verify a system against an assertion in the specification. The assertion monitor includes a parser configured to generate a propositional formula representing an assertion in the specification using Boolean propositions, a filter configured to generate a trace of truth assignments for the propositional symbols and a trace verifier configured to verify the assertion using the trace of truth assignments for the propositional symbols and the propositional formula.

17 Claims, 8 Drawing Sheets

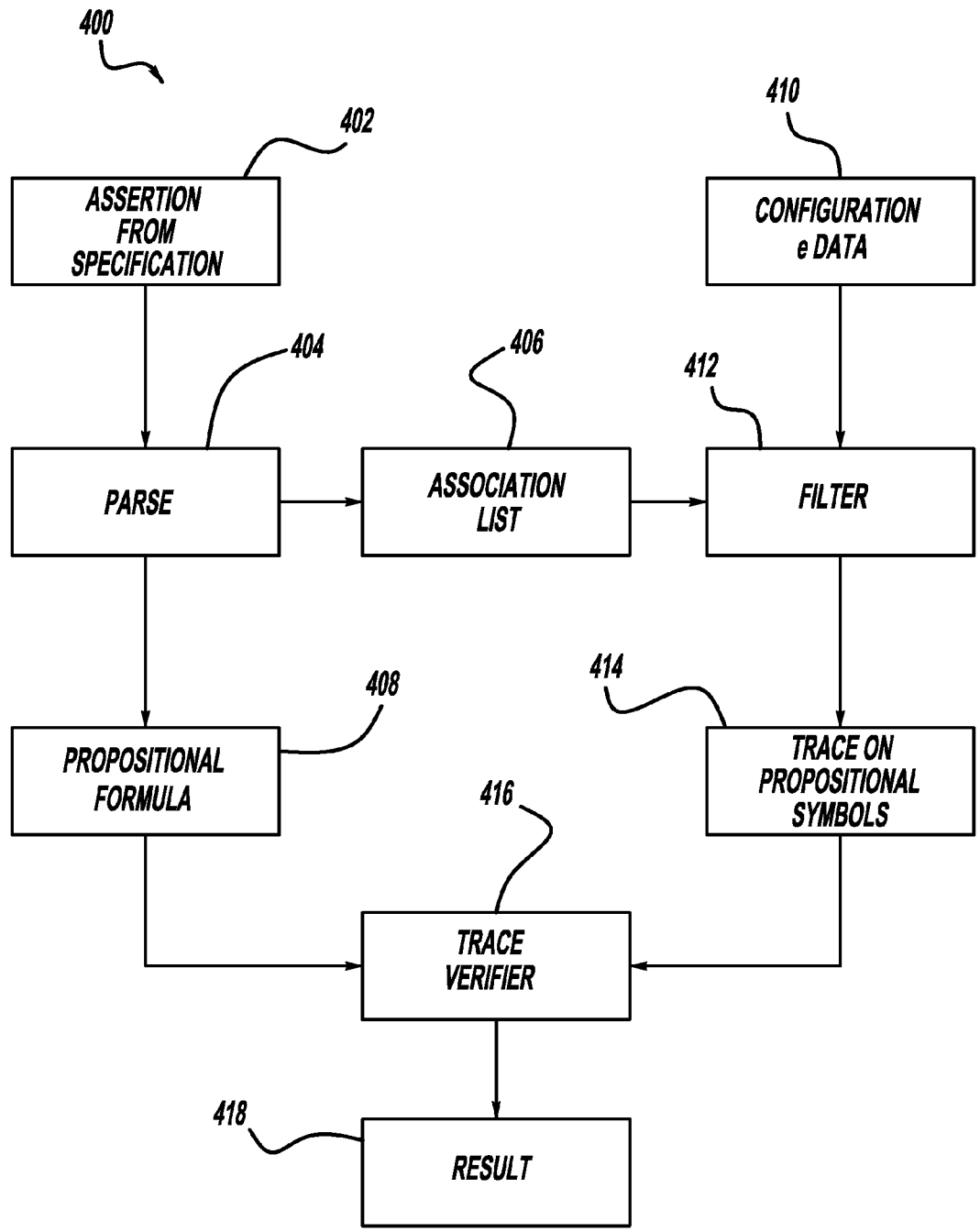

OFFLINE FORMAL VERIFICATION OF EXECUTABLE MODELS

BACKGROUND

In general, a system development process includes a requirements development stage, a design and development stage and a verification stage. A requirement may be characterized as a documented need of how a particular product or service should perform. More particularly, a requirement may be referred to as a statement that identifies the necessary functionalities, attributes, capabilities, characteristics or qualities of a system. Requirements in the form of a requirements specification are used as inputs into the design stages of a system development process to design what elements and functions are necessary for a particular system.

Requirement specifications can be expressed using a variety of languages. These languages may be graphical or textual in nature and may include, without limitation, transition systems (e.g., state machines), event sequence charts (e.g., scenario or sequence diagrams) and structured English language. The system is implemented using software or hardware or both, often using interfaces implemented using sensors to sense the environment (including the user) inputs and actuators to control the hardware. In complex systems, particularly those in which safety is a primary concern, exhaustive testing and verification of the system, is required to ensure that the behavior of the system satisfies the requirements specification of the system.

A common approach to testing and verifying system is formal verification. Broadly, formal verification is the process of proving or disproving the correctness of intended algorithms underlying a system with respect to a formal specification (also referred to as a property), using a class of state space exploration methods. One formal verification approach is model checking, which is an automatic, systematic, exhaustive exploration of the behaviors of the model. Usually, this includes exploring all states and transitions in the model by using smart and domain-specific abstraction techniques to consider whole groups of states in a single operation and reduce computing time. Implementation techniques include state space enumeration, symbolic state space enumeration, abstract interpretation, symbolic simulation and abstraction refinement. The properties to be verified are often described in a temporal logic, such as linear temporal logic (LTL) or computational tree logic (CTL).

Known formal verification methods are normally applicable only to the models of the system at the design stage, or to the software portion of the systems. Although theoretically possible, models for entire systems can be impossible to implement, or at best, be extremely large so that existing formal methods techniques cannot scale to tackle the resulting large state space. Therefore, testing using simulation of the system is the only way of verifying the system against its requirements specification. However, since the test cases (test inputs to the system and the desired outputs) are written by testers, they usually test only simple specifications. This is because writing test cases for complex temporal specifications is error-prone. In addition, checking the simulation runs against the desired outputs according to complex temporal specifications is also time consuming and error-prone. Thus, there is a need to provide a system and method for automatic formal verification of an executable system that is scalable to any size system.

SUMMARY

A system and method for automatic formal verification of an executable system includes a parser configured to generate a propositional formula representing an assertion in the specification using Boolean propositions, a filter configured to generate a trace of truth assignments for the propositional symbols and a trace verifier configured to verify the assertion using the trace of truth assignments for the propositional symbols and the propositional formula.

The method for verifying a system against an assertion in a specification includes generating a propositional formula representing an assertion in the specification using Boolean propositions wherein each Boolean proposition associated with an atomic assertion in the assertion and generating a trace representing a sequence of configurations of the system with respect to the assertion, wherein the trace includes trace configuration data representing a configuration of the system in response to a particular trace. The method further includes converting the trace configuration data into truth assignments for a set of propositional symbols, generating a trace of the system using the truth assignments for the propositional symbols and verifying the assertion using the trace of truth assignments for the propositional symbols and the propositional formula.

Additional features will become apparent from the following description and appended claims, taken in conjunction with the accompanying drawings.

BRIEF DESCRIPTION OF THE DRAWINGS

FIG. 8 illustrates an exemplary algorithm for evaluating an assertion, according to FIG. 7.

DETAILED DESCRIPTION OF THE EMBODIMENTS

The embodiments described herein relate generally to a system and method for formal verification of executable systems and, more particularly, to a system and method for automatic formal verification of an executable system against designated portions of a specification. The system and method employ an assertion-based verification process that is scalable to any size system and configured to operate with or without direct accessibility to the system (i.e., online or offline, respectively).

Using one online approach to the formal verification system, a suite of test cases is developed to verify a particular assertion from the specification. In general, an assertion is a true-false statement used to verify certain properties of variables contained in the specification. The test cases are simulated by the system and the results sent to an assertion monitor for evaluation and verification of the assertion.

Using an offline approach to the formal verification system, a set of traces representing a sequence of configurations of the system are generated and input to the system. The configuration for each trace is sent to the assertion monitor for evaluation and verification of the assertions contained therein.

Online Verification System

Figure 1:
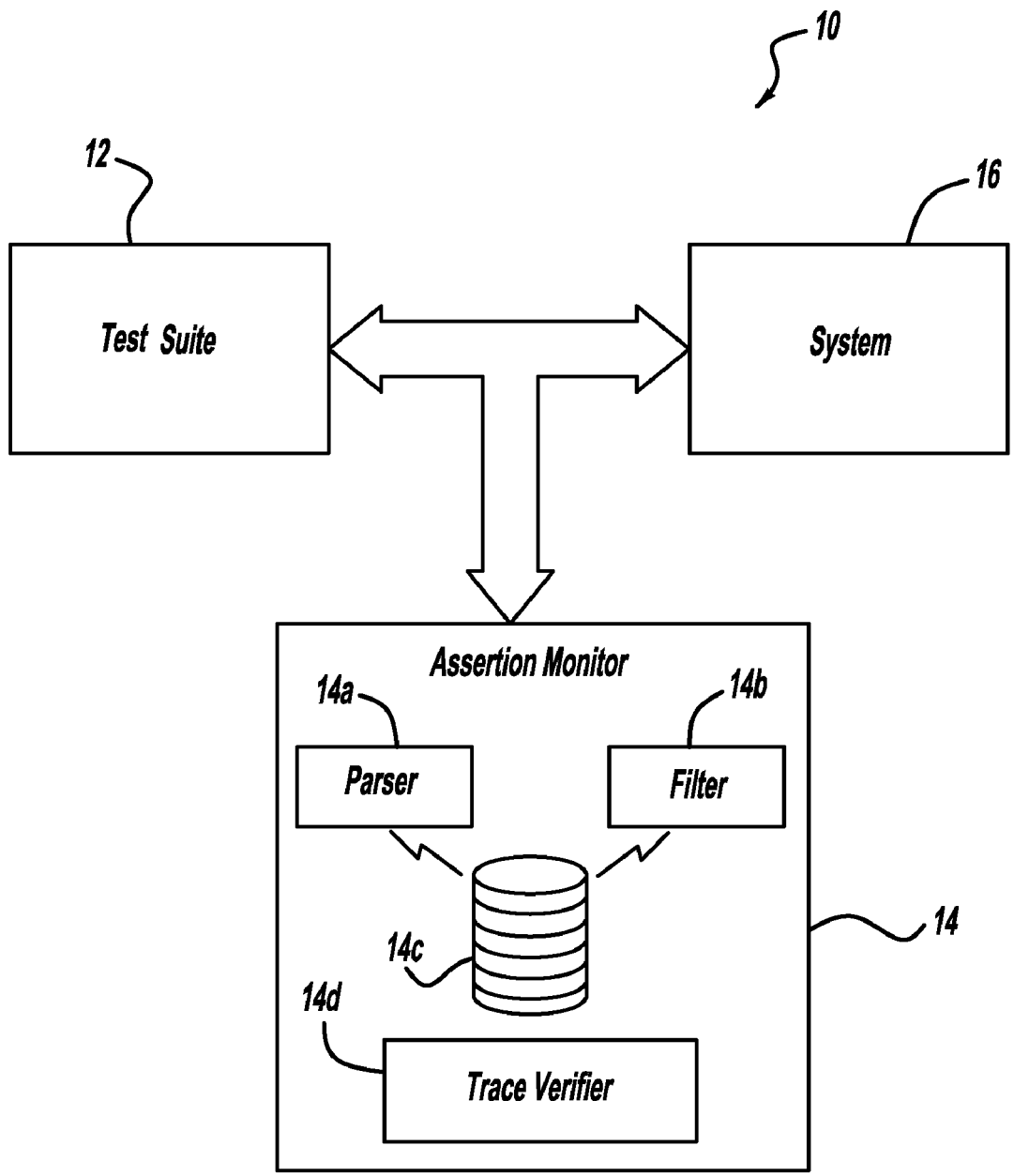
FIG. 1 illustrates an exemplary system for online formal verification of an executable system, according to an embodiment.

FIG. 1 illustrates an exemplary online formal verification system 10 having a test suite 12 in communication with an assertion monitor 14 and an executable system 16. System 10 may be implemented on one or more suitable computing devices, which generally include applications that may be software applications tangibly embodied as a set of computer-executable instructions on a computer readable medium within the computing device. The computing device may be any one of a number of computing devices, such as a personal computer, processor, handheld computing device, etc.

Computing devices generally each include instructions executable by one or more devices such as those listed above. Computer-executable instructions may be compiled or interpreted from computer programs created using a variety of programming languages and/or technologies, including without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable media includes any medium that participates in providing data (e.g., instructions), which may be read by a computing device such as a computer. Such a medium may take many forms, including, but not limited to, non-volatile media, volatile media, and transmission media. Non-volatile media includes, for example, optical or magnetic disks and other persistent memory. Volatile media include dynamic random access memory (DRAM), which typically constitutes a main memory. Common forms of computer-readable media include any medium from which a computer can read.

Referring to FIG. 1, test suite 12 is a collection of test cases designed to assess the behavior of the system for various assertions set forth in the specification. In general, a test case is a sequence of inputs and a sequence of expected outputs, but may also include a test case ID, test description, related or prerequisite requirements, a test category, remarks, etc. Test suite 12 may be stored using any accessible media including, but not limited to, a file such as a word processor document, spreadsheet, table or database.

Assertion monitor 14, as explained in greater detail below, includes a parser 14a, a filter 14b, a storage device 14c, and a trace verifier 14d. The parser 14a is software that breaks down an assertion in the specification written in a logical language such as LTL and outputs a set of atomic assertions (assertions that cannot be broken down further). The storage device 14c stores an association list associating each atomic assertion produced by the parser 14a with a unique propositional symbol.

The filter 14b is software that take as input a configuration of the system assigning values to the variables mentioned in the assertions and assigns truth values (True or False) the propositional symbols by evaluating the corresponding atomic assertions using the values of the variables in the configuration. The trace verifier 14d has the propositional formula F, which is the assertion where all the atomic assertions have been replaced by the corresponding propositional symbols. The trace verifier 14d evaluates F using the truth value of the propositions for each of the configurations in the sequence of configurations obtained from the trace of the system corresponding to a test case.

As described in further detail below, each test case within the test suite is simulated by the executable system written in a modeling language such as, but not limited to, C, C++, Unified Modeling Language (UML) and Simulink/Stateflow. The simulation results are sent to the assertion monitor 14 for evaluation and verification of the test case assertion.

Figure 2:
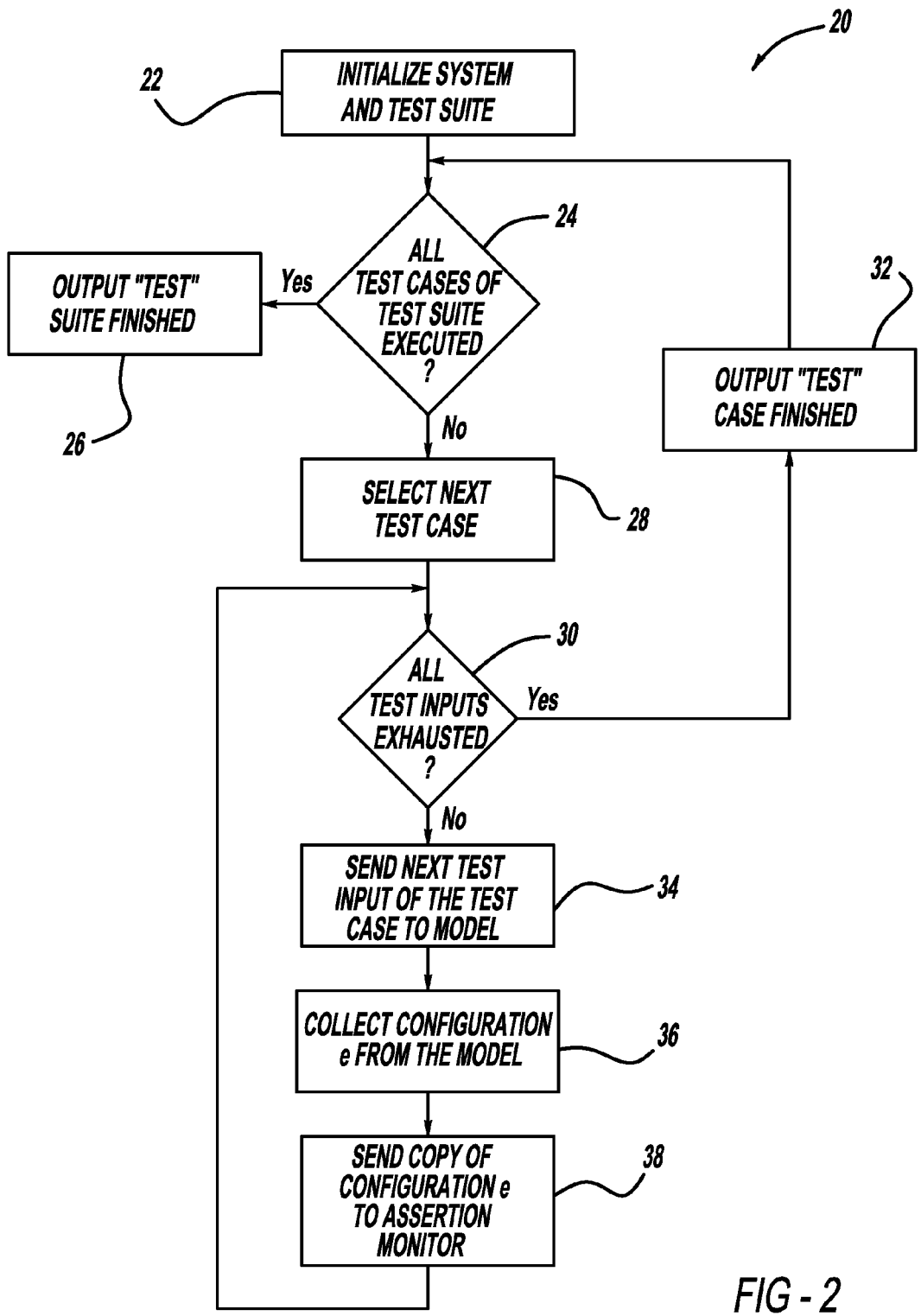
FIG. 2 illustrates an exemplary assertion-based verification algorithm that utilizes the system to verify the test case assertions according to the embodiment shown in FIG. 1.

FIG. 2 illustrates an exemplary assertion-based verification algorithm 20 that utilizes the executable system 16 to verify the test case assertions according to the system shown in FIG. 1. The algorithm 20 begins at step 22 by initializing the executable system 16 and the test suite 12. At step 24, algorithm 20 determines if all the test cases in the initialized test suite have executed. If so, a "Test Suite Finished" output is generated at step 26. If the test suite 12 still contains unexecuted test cases, at step 28 the next test case in the suite 12 is selected. At step 30, algorithm 20 determines if all of the inputs from the selected test case have been exhausted. If so, a "test case finished" output is generated at step 32. If there are still inputs to be executed, at step 34 the next test input from the selected test case is sent to the system 16 for simulation. The test case simulation data representing the configuration of a system (e.g. model), referred to hereinafter as "configuration e", is collected from the system 16 at step 36. In this example, configuration e includes the test case input, the state variables with current values and the output variables with current values. The sequence of configurations of the system corresponding to a test case may also be referred to as a run of the system. At step 38 a copy of configuration e is sent to the assertion monitor 14 for evaluation and verification of the assertion. In one non-limiting approach, the data associated with configuration e is stored in a file or database, or otherwise made accessible to other system components and/or processes, as described below in detail with respect to other features of the system.

Figure 3:
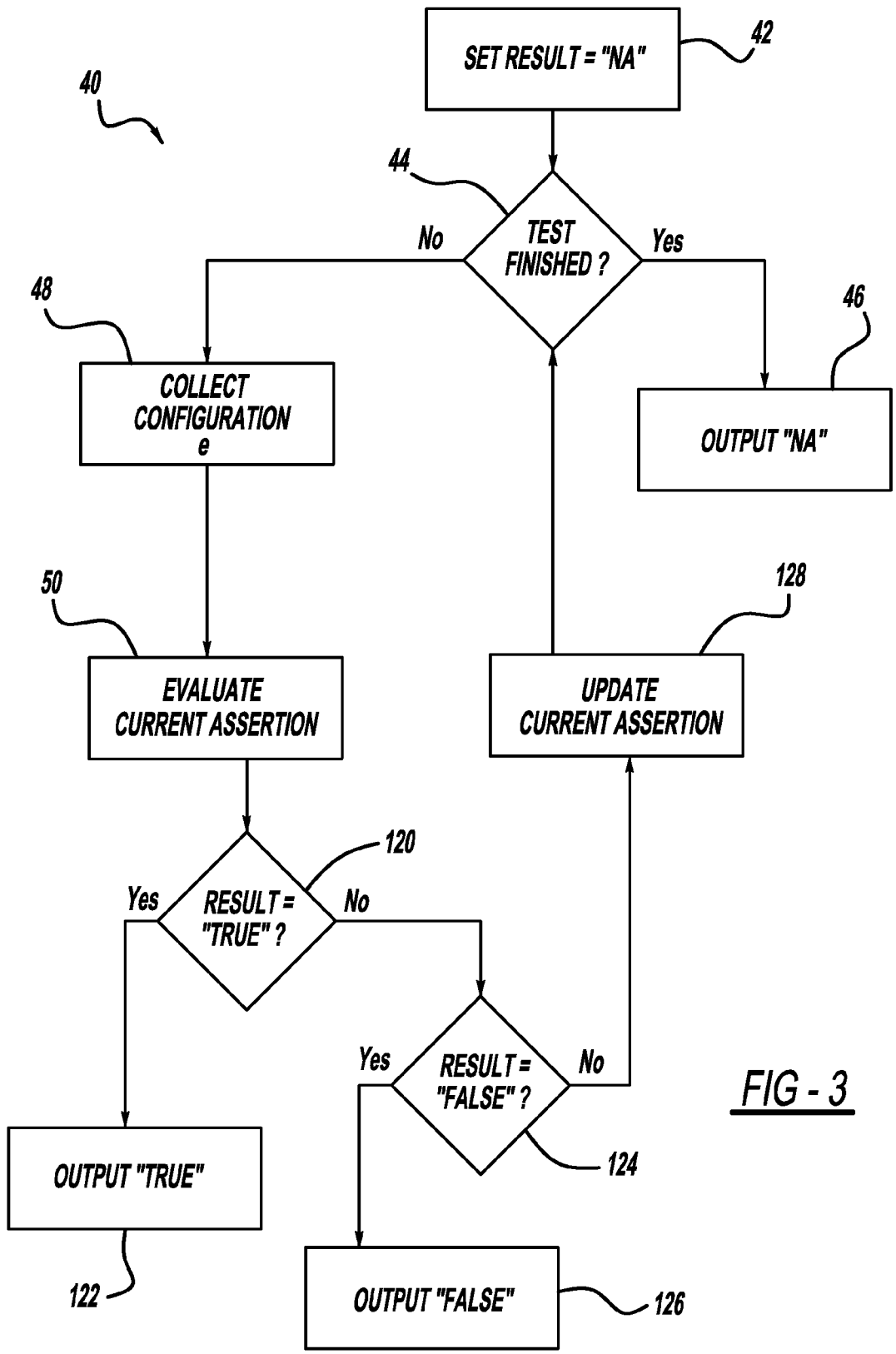
FIG. 3 illustrates an exemplary algorithm for implementing an assertion monitor, according to FIG. 2.

FIG. 3 illustrates an exemplary algorithm 40 for implementing assertion monitor 14. The algorithm is initialized at step 42 by setting the Result variable to "NA," meaning that a true or false result is not applicable based on the current information, or in some cases, "NA" may represent an initialized placeholder for the value of the Result when the process begins or ends. At step 44, algorithm 40 determines if the current test is finished. If so, the system outputs "NA" at step 46. If the selected test case is not finished, configuration e is collected at step 48 and the current assertion is evaluated at step 50.

Figure 4:
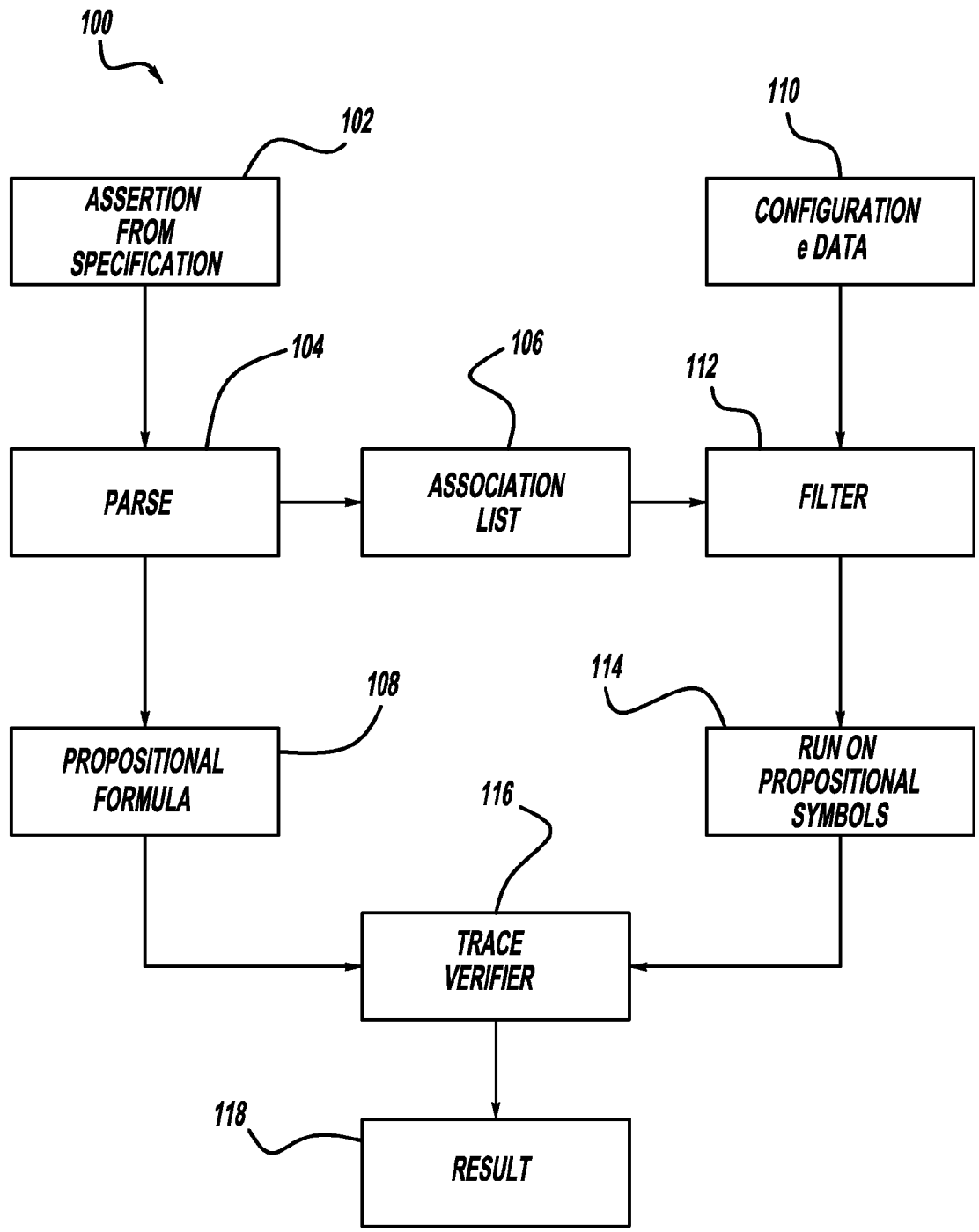
FIG. 4 illustrates an exemplary algorithm for evaluating an assertion according to FIG. 3.

FIG. 4 illustrates an algorithm 100 for evaluating the current assertion according to step 50 of FIG. 3. Using this algorithm, the selected test case designed to verify a particular assertion is evaluated against the specification requirements for that assertion. In other words, results from the test case simulation of the system (i.e., configuration e) are evaluated against the corresponding assertion from the specification to determine if the assertion expressed by the system satisfies the requirements of the specification.

Algorithm 100 begins at step 102 by extracting the given assertion from the specification, which is generally written in a formal language that views time as a sequence of states such as linear temporal logic (LTL). In temporal logic, a statement can be constant in time, but its truth value may vary in time. For instance, at one given time, the statement may be true, but at another time, the statement may be false. However, no statement can be true or false simultaneously in the same state (e.g., a moment in time, point in time or an instant). Having the specification written in a formal language allows the system to automatically simulate and verify the system 16 against the specification.

Using one approach, the specification is written in Action-LTL, which is a variant of linear temporal logic (LTL) in that it allows complex temporal requirements such as event occurrences, arithmetic expressions and parametric functions to be specified. The ActionLTL assertion is then converted to Boolean propositions at step 104 using parser 14a. In other words, the complex expressions in the assertion are broken down into elemental atomic expressions, which in this case, are Boolean expressions in their simplest form. At step 106, each atomic expression is assigned a propositional symbol and the collective assignments are output to an association list that stores the association between the expressions of variables in Boolean form and the assigned propositional symbols. In this example, the association list is stored in storage device 14c, but as understood by one of ordinary skill in the art, any means suitable for storing, accessing and retrieving the association list may be used. At step 108 algorithm 100 generates a propositional formula by replacing each atomic expression with the corresponding propositional symbol. As explained in greater detail below, the propositional formula is input to trace verifier 14d (FIG. 1) and used in conjunction with other system features to evaluate and verify the given assertion.

At step 110, filter 14b retrieves configuration e data, including state variables and values. At step 112, a filtering program associated with filter 14b assigns truth values (True or False) to each propositional symbol corresponding to the atomic assertions using the values of the variables in each configuration. More specifically, filter 14b looks to the association list to determine which atomic expression is assigned to which propositional symbol. The relationship between the atomic expressions and the propositional symbols is used by filter 14b at step 114 to convert the test case simulation of the system 16 (i.e., run of the system) into a sequence of truth value assignments to the propositional symbols. Thus, instead of having a simulated test case being a run on variables expressed in a formal language, the filter 14b generates a sequence of assignments to the propositional symbols.

At step 116, the propositional formula from step 108 and the sequence of assignments to the propositional symbols from step 114 are input to trace verifier 14d to formally verify that the assertion presented in the system 16 satisfies the assertion set forth in the specification. At step 118, the trace verifier outputs the Result of the trace.

Referring back to FIG. 3, algorithm 40 determines at step 120 if the Result of the trace from step 118 is "true," meaning that the trace verifier 14d was able to verify the system 16 against the specification for the given assertion. If yes, the Result is "true", then the system outputs at step 122 a "true" statement. If the Result is not "true," algorithm 40 determines at step 124 if the Result is "False." If a false Result is determined, the system outputs at step 126 a "False" statement. If the Result is not false, the current assertion is updated at step 128 by logging information relating to the evaluation. If a Result is neither true nor false, this is an indication to the system that further processing and evaluation of the states needs to be completed.

Offline Verification System

Figure 5:
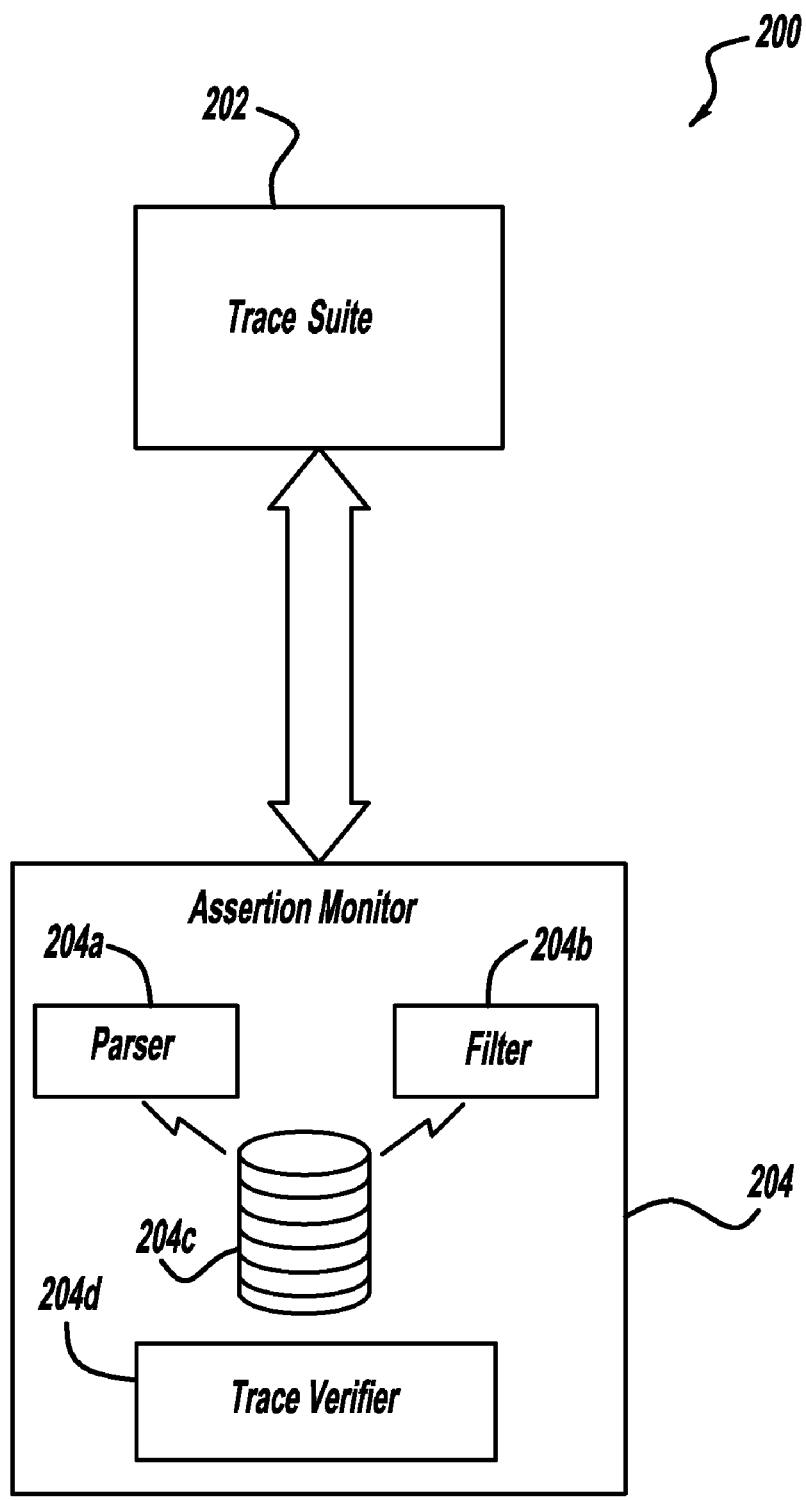
FIG. 5 illustrates an exemplary offline formal verification system, according to an embodiment.

FIG. 5 illustrates an exemplary offline formal verification system 200. Like the online system of FIG. 1, offline verification system 200 is configured to verify assertions from the specification with respect to a particular system, but without having access to the actual system during testing. Verification system 200 includes a trace suite 202 in communication with an assertion monitor 204. The assertion monitor 204 of the offline system 200 is substantially the same as the online assertion monitor 14 in that assertion monitor 204 includes a parser 204a, a filter 204b, a storage device 204c, and a trace verifier 204d. Trace suite 202, however, in contrast to test suite 12 of FIG. 1 that uses test cases simulated on the system, uses a set of traces to confirm the assertions from the specification. In one example, the traces represent a sequence of configurations of the system that are input into the assertion monitor 204 for verification. The traces may be generated from any suitable test generation software, such as, but not limited to, Reactis®. From one perspective, the traces are similar to the runs of the system using the online approach described above in that the traces include a sequence of inputs, state variables and output variables. In other words, the trace configurations represent chosen state and output variables of the system in response to a specific input sequence.

Figure 6:
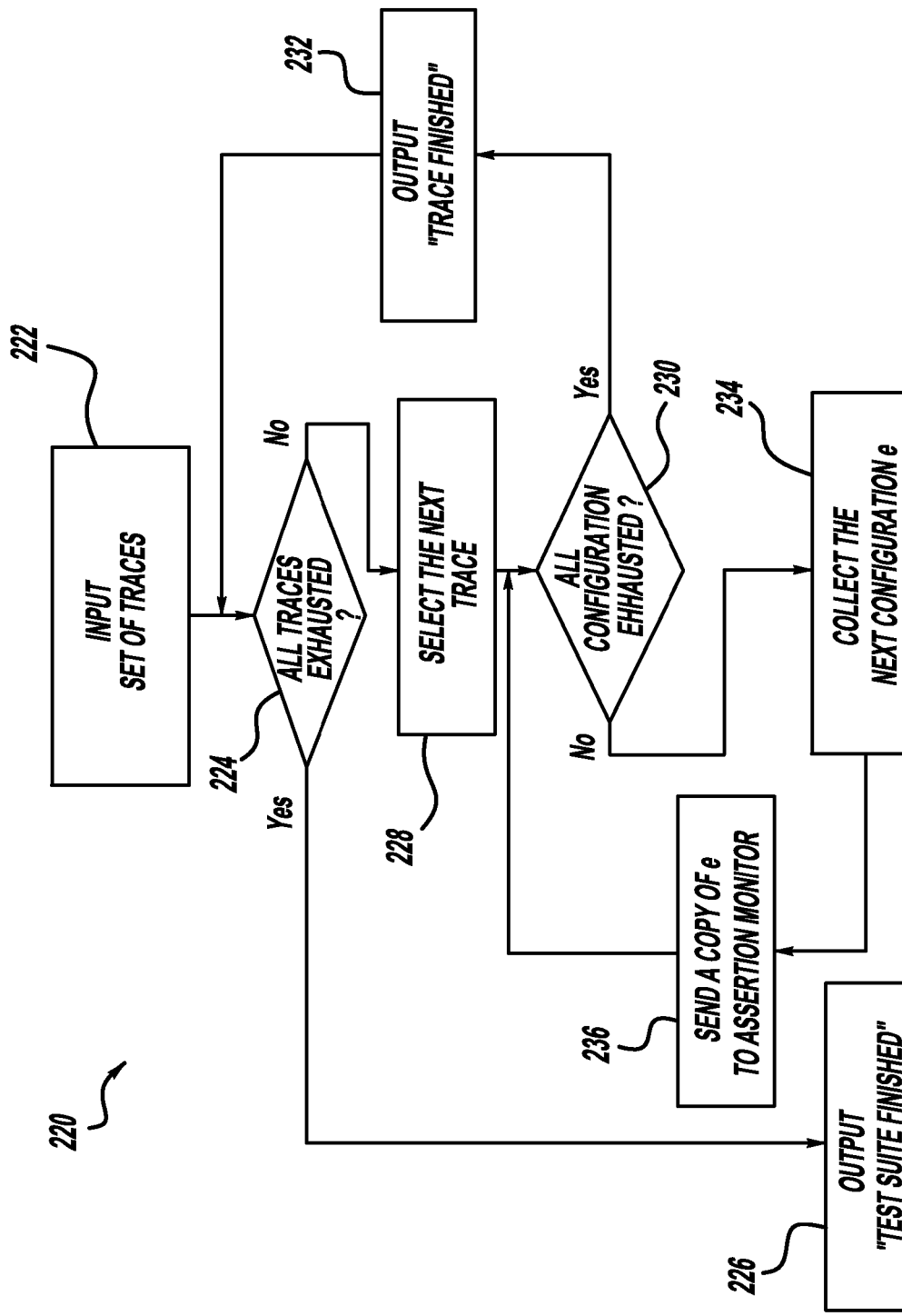
FIG. 6 illustrates an exemplary assertion-based verification algorithm that utilizes a set of traces to verify assertions in the specification according to the system shown in FIG. 5.

FIG. 6 illustrates an exemplary assertion-based verification algorithm 220 that utilizes a set of traces to verify assertions in the specification according to the system shown in FIG. 5. Algorithm 220 begins at step 222 by loading the set of traces into the system 200. At step 224, algorithm 220 determines if all the traces in the loaded test suite 202 have executed. If so, a "Trace Suite Finished" output is generated at step 226. If the trace suite 202 still contains unexecuted traces, at step 228 the next trace in the suite 202 is selected. At step 230, algorithm 200 determines if all configurations (e.g., runs) of the selected trace have been exhausted. If so, a "Trace Finished" output is generated at step 232. If there are still configurations to be executed, trace configuration data representing the configuration of a system according to a given trace, referred to hereinafter as "configuration e", is collected at step 234. In this example, configuration e includes the trace input sequence, the state variables with current values and the output variables with current values. At step 236, a copy of configuration e is sent to the assertion monitor 204 for evaluation and verification of the assertion. In one non-limiting approach, the data associated with configuration e is stored in a file or database, or otherwise made accessible to other system components and/or processes, as described below in detail with respect to other features of the system.

Figure 7:
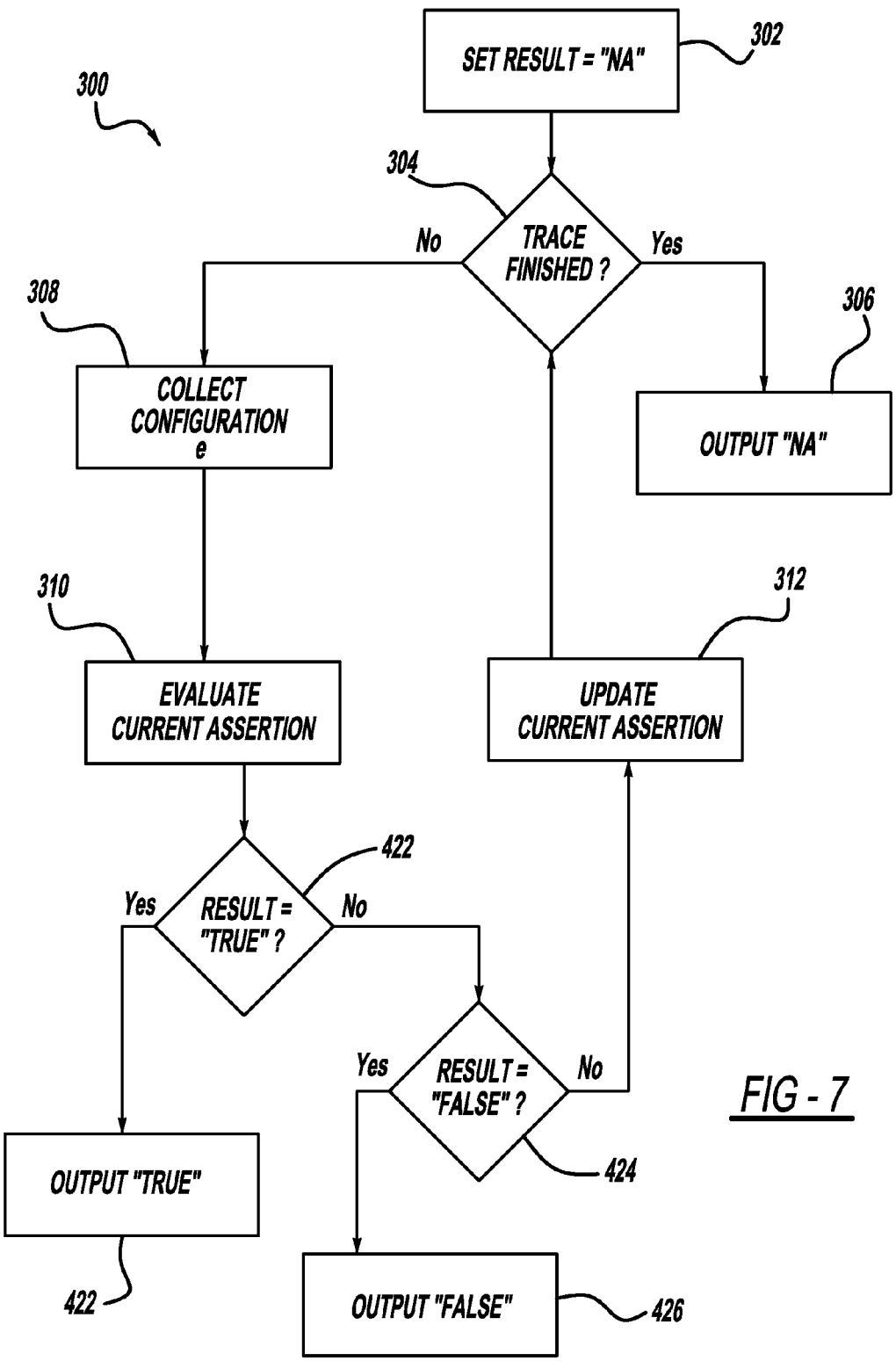
FIG. 7 illustrates an exemplary algorithm for implementing assertion monitor, according to FIG. 6.

FIG. 7 illustrates an exemplary algorithm 300 for implementing assertion monitor 204. The algorithm 300 is initialized at step 302 by setting the Result variable to "NA," meaning that a true or false result is not applicable based on the current information, or in some cases, "NA" may represent an initialized placeholder for the value of the Result when the process begins or ends. At step 304, algorithm 300 determines if the current trace is finished. If so, the system outputs "NA" at step 306. If the selected trace is not finished, configuration e is collected at step 308 and the current assertion is evaluated at step 310.

FIG. 8 illustrates an algorithm 400 for evaluating the current assertion according to step 310 of FIG. 7. Using this algorithm, the selected trace designed to verify a particular assertion is evaluated against the specification requirements for that assertion. In other words, results from the trace of the system (i.e., configuration e) are evaluated against the corresponding assertion from the specification to determine if the assertion expressed by the system satisfies the requirements of the specification.

Algorithm 400 begins at step 402 by extracting the given assertion from the specification, which is generally written in a formal language such as linear temporal logic (LTL) or ActionLTL, which is a variant of linear temporal logic (LTL) in that it allows complex temporal requirements such as event occurrences, arithmetic expressions and parametric functions to be specified. The ActionLTL assertion is then parsed at step 404 using parser 204a to identify Boolean propositions. In other words, the complex expressions in the assertion are broken down into elemental atomic expressions, which in this case, are Boolean expressions in their simplest form. At step 406, each atomic expression is assigned a propositional symbol and the collective assignments are output to an association list that stores the association between the expressions of variables in Boolean form and the assigned propositional symbols. In this example, the association list is stored in storage device 204c, but as understood by one of ordinary skill in the art, any means suitable for storing, accessing and retrieving the association list may be used. At step 408, algorithm 400 generates a propositional formula by replacing each atomic expression with the corresponding propositional symbol. As explained in greater detail below, the propositional formula is input to trace verifier 204d (FIG. 5) and used in conjunction with other system features to evaluate and verify the given assertion.

At step 410, filter 14b retrieves configuration e data from the selected trace, including state variables and values. At step 412, a filtering program associated with filter 204b assigns truth values (True or False) to each propositional symbol corresponding to the atomic assertions using the values of the variables in each configuration. More specifically, filter 204b looks to the association list to determine which atomic expression is assigned to which propositional symbol. The relationship between the atomic expressions and the propositional symbols is used by filter 204b at step 414 to convert the trace of the system (i.e., run of the system) into a sequence of truth value assignments to the propositional symbols. Thus, instead of having a trace run on variables expressed in a formal language, the filter 204b generates a sequence of assignments to the propositional symbols.

At step 416, the propositional formula from step 408 and the trace on truth assignments to propositional symbols from step 414 are input to trace verifier 204d to formally verify that the trace satisfies the assertion set forth in the specification. At step 418, the trace verifier outputs the Result of the trace.

Referring back to FIG. 7, algorithm 300 determines at step 420 if the Result of the assertion monitor from step 418 is "true," meaning that the trace verifier 204d was able to verify the trace against the specification for the given assertion. If yes, the Result is "true", then the system outputs at step 422 a "true" statement. If the Result is not "true," algorithm 300 determines at step 424 if the Result is "False." If a false Result is determined, the system outputs at step 426 a "False" statement. If the Result is not false, the current assertion is updated at step 428 by logging information relating to the evaluation. If a Result is neither true nor false, this is an indication to the system that further processing and evaluation of the states needs to be completed.

It is to be understood that the above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that further developments will occur in the arts discussed herein, and that the disclosed systems and methods will be incorporated into such further examples. In sum, it should be understood that the invention is capable of modification and variation and is limited only by the following claims.

The present embodiments have been particular shown and described, which are merely illustrative of the best modes. It should be understood by those skilled in the art that various alternatives to the embodiments described herein may be employed in practicing the claims without departing from the spirit and scope of the invention and that the method and system within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable construction and their ordinary meaning as understood by those skilled in the art unless an explicit indication to the contrary is made herein. In particular, use of the singular articles such as "a", "the", "said", etc. should be read to recite one or more of the indicated elements unless a claim recites an explicit limitation to the contrary.

What is claimed is:

1. A method for verifying an executable system against an assertion in a specification, the method comprising the steps of:
    generating a propositional formula representing an assertion in the specification using Boolean propositional symbols, each Boolean propositional symbol being associated with an atomic assertion in the assertion;
    generating a set of traces representing a sequence of configurations of the system with respect to the assertion, wherein the traces include trace configuration data representing a configuration of the system in response to a particular trace;
    converting the trace configuration data into truth assignments for a set of propositional symbols;
    generating a trace of the system using the truth assignments for the propositional symbols; and
    verifying the assertion using the trace of truth assignments for the propositional symbols and the propositional formula.

2. The method of claim 1, wherein the trace configuration data includes a sequence of inputs, state variables, state information and output variables.

3. The method of claim 1, wherein the assertion in the specification is written in a formal language.

4. The method of claim 1, further including generating an association list that identifies the relationship between the atomic assertions and the propositional symbols.

5. The method of claim 4, wherein converting the trace configuration data into propositional symbols includes converting the trace configuration data into Boolean symbols using the association list.

6. The method of claim 1, wherein the trace is a test suite comprising a plurality of traces.

7. A computer-readable medium tangibly embodying computer-executable instructions for:
    generating a propositional formula representing an assertion in the specification using Boolean propositional symbols, each Boolean propositional symbol associated with an atomic assertion in the assertion;
    generating a set of traces representing a sequence of configurations of the system with respect to the assertion, wherein the traces include trace configuration data representing a configuration of the system in response to a particular trace;

converting the trace configuration data into truth assignments for a set of propositional symbols;

generating a trace of the system using the truth assignments for the propositional symbols; and verifying the assertion using the trace of truth assignments for the propositional symbols and the propositional formula.

8. The computer-readable medium of claim 7, wherein the trace configuration data includes a sequence of inputs, states, state variables and output variables.

9. The computer-readable medium of claim 7, further including generating an association list that identifies the relationship between the atomic assertions and the propositional symbols.

10. The computer-readable medium of claim 9, wherein converting the trace configuration data into truth assignments for a set of propositional symbols includes converting the trace configuration data into truth assignments for Boolean symbols using the association list.

11. The computer-readable medium of claim 7, wherein the trace is a test suite comprising a plurality of traces.

12. An assertion monitor configured to verify an executable system against an assertion in a specification, the assertion monitor comprising:

a computer with a memory running an assertion monitor program that includes:

a parser configured to generate a propositional formula representing an assertion in the specification using Boolean propositional symbols;

a filter configured to generate a set of traces of truth assignments for the propositional symbols;

a converter configured to convert the traces of the system to propositional symbols so that the propositional symbols hold data from the configuration data and from the traces of the system; and a trace verifier configured to verify the assertion using the trace of truth assignments for the propositional symbols and the propositional formula.

13. The assertion monitor of claim 12, wherein the parser converts the assertion in the specification to Boolean propositions by parsing the assertion into atomic assertions in Boolean form and assigning each of those assertions to a propositional symbol.

14. The assertion monitor of claim 13, wherein the parser is further configured to generate an association list that identifies the relationship between the atomic assertions and the propositional symbols used to specify the Boolean propositions.

15. The assertion monitor of claim 12, wherein the filter is configured to receive trace configuration data representing a sequence of configurations of the system with respect to the assertion.

16. The assertion monitor of claim 12, wherein the filter is configured to convert trace configuration data representing a sequence of configurations of the executable system into a sequence of truth assignments for the Boolean propositional symbols using an association list generated by the parser that identifies a relationship between Boolean expressions and propositional symbols used to generate the Boolean propositions.

17. The assertion monitor of claim 12, wherein the assertion in the specification is written in a formal language.

* * * * *